United States Patent [19]
Friberg

[11] Patent Number: 5,518,210
[45] Date of Patent: May 21, 1996

[54] SEAL PLATE FOR AIRCRAFT MOVABLE FLIGHT CONTROL SURFACES

[75] Inventor: Darren A. Friberg, Santa Ana, Calif.

[73] Assignee: McDonnell Douglas Corporation, Long Beach, Calif.

[21] Appl. No.: 225,739

[22] Filed: Apr. 11, 1994

[51] Int. Cl.$^6$ .............. B64C 3/50; B64C 21/00; B64C 5/10; B64C 9/00
[52] U.S. Cl. .............. 244/215; 244/198; 244/204; 244/212; 244/90 R
[58] Field of Search .............. 244/198, 200, 244/201, 204, 212, 213, 214, 215, 219, 90 R, 90 A

[56] References Cited

U.S. PATENT DOCUMENTS

| | | | |
|---|---|---|---|
| 1,893,064 | 1/1933 | Zaparka | 244/198 |
| 4,032,087 | 6/1977 | Cleaves | 244/214 |
| 4,600,172 | 7/1986 | Loth | 244/212 |
| 4,632,340 | 12/1986 | Duea | 244/200 |
| 5,335,886 | 8/1994 | Greenhalgh | 244/213 |

FOREIGN PATENT DOCUMENTS

| | | | |
|---|---|---|---|
| 663916 | 5/1964 | Italy | 244/215 |
| 2038995 | 7/1980 | United Kingdom | 244/213 |

*Primary Examiner*—Andres Kashnikow
*Assistant Examiner*—Virna Lissi Mojica
*Attorney, Agent, or Firm*—Donald E. Stout

[57] ABSTRACT

A fixed seal plate for an aircraft functions to seal the gap between a movable flight control surface and its associated airfoil when the control surface is in a deflected position. The seal plate is fixed to the airfoil (typically a wing) so that it does not articulate with the airfoil movable surface, therefore having no moving parts, yet blocks airflow through the gap effectively enough to measurably improve aircraft flight performance by reducing aerodynamic drag.

20 Claims, 2 Drawing Sheets

SEAL PLATE FOR AIRCRAFT MOVABLE FLIGHT CONTROL SURFACES

BACKGROUND OF THE INVENTION

This invention relates to a movable flight control surface on an aircraft, and more particularly to an apparatus for sealing the gap between the control surface and the airfoil on which it is mounted, when the control surface is in a deflected position, thereby decreasing the aerodynamic drag of the aircraft.

Referring now to FIGS. 1 and 2 of the drawing, FIG. 1 illustrates an aircraft 10 of a type known in the art, such as an MD-11® jetliner, manufactured by McDonnell Douglas Corporation of Long Beach, Calif. The aircraft has a pair of airfoils or wings 12, on which are mounted a plurality of engines 14. The wings each further include a leading edge 16 and a trailing edge 18.

In order to maintain flight control of the aircraft, it is known in the art to employ movable control surfaces along the trailing edge 18 of each aircraft wing 12. For example, flaps 20 on each wing 12 may be extended rearwardly to one or more deflected positions spaced from the trailing edge 18, in order to increase lift during take-off and drag during landing, thereby permitting the aircraft to fly at lower than normal speeds without stalling. Similarly, outboard ailerons 22 and inboard ailerons 24 may be extended rearwardly to one or more deflected positions spaced from the wing trailing edge 18 in order to control the aircraft's rolling and banking movements during flight.

In state of the art aircraft, when a movable control surface is in a deflected position on the airfoil, streamwise gaps are formed between each edge of the control surface and corresponding edges of the airfoil. With particular reference to prior art FIG. 2, this is illustrated for the case of an outboard drooped aileron 22, though it is equally applicable to other movable control surfaces, such as flaps or inboard ailerons, as well. Thus, as illustrated, a gap 26 is formed between the outboard edge 28 of the aileron 22 and a corresponding first edge 30 of the airfoil. A similar gap is formed on the inboard side of the aileron as well, between the aileron inboard edge 32 and a corresponding second airfoil edge 34. These resultant gaps permit air to flow therethrough, as illustrated by the arrows 36, 38. The air leakage reduces the effectiveness of the movable surface, and correspondingly increases the aerodynamic drag of the aircraft.

With modern large jet transport aircraft, any measurable drag penalty, even if only a fraction of one percent, will result in significant additional fuel costs, amounting to many thousands or even millions of dollars fleetwide during the course of an operating year. In the highly competitive airline industry, where profit margins are often razor thin, this can make the different between solvency and insolvency. Even more importantly, such drag penalties, especially if they are cumulative with other drag penalties, such as underperforming engines, may cause a range shortfall for the aircraft which is significant enough to prevent it from effectively flying non-stop routes for which it may have been designed or acquired. Such a range shortfall, and the resultant loss of ability to fly certain long range non-stop routes may place an aircraft at a severe competitive disadvantage.

Current solutions for reducing the gap between movable flight control surfaces and the airfoil on which they are mounted involve the use of flexible seals on the edges of the surface or the fixed airfoil. The seals are designed to reduce the gap between the airfoil and the movable surface when the surface is not deflected, but they do nothing to prevent the above discussed airflow leakage when the movable surface is deflected.

Thus, what is needed is a solution for the problem of airflow leakage through the gaps between a movable control surface and its associated airfoil when the control surface is in an extended deflected position, thereby reducing aerodynamic drag and consequently improving the flight efficiency of the aircraft.

SUMMARY OF THE INVENTION

This invention solves the above outlined problem by providing a simple, yet effective seal plate for sealing the gap between a movable flight control surface and its associated airfoil when the control surface is in a deflected position. The seal plate is fixed to the airfoil such that it does not articulate with the airfoil movable surface, therefore having no moving parts, yet blocks airflow through the aforementioned gap effectively enough to measurably improve aircraft flight performance.

More specifically, an apparatus is provided for sealing a streamwise gap between a movable flight control surface and an airfoil of an aircraft when the movable control surface is in a deflected position, wherein the apparatus comprises a fixed seal plate attached at one end to the airfoil. The seal plate extends generally vertically therefrom, generally in a downward direction, and is fixed to the airfoil at a location adjacent to one end of the movable control surface, so that any streamwise gap which may otherwise be formed between the airfoil and the one end of the movable control surface when the control surface is deflected is substantially sealed by the seal plate.

Preferably, a second seal plate is provided, which is fixed to the airfoil at a location adjacent to a second end of the movable control surface, so that any streamwise gap which may otherwise be formed between the airfoil and the second end when the flight surface is deflected is substantially sealed by the second seal plate.

Optionally, a flexible seal may be attached to one or both ends of the movable control surface, which is adapted to provide a substantially fluid-tight seal between the movable control surface and the seal plate, thereby improving the sealing relationship between the movable control surface and the airfoil when the movable control surface is in a deflected position.

In the preferred embodiment, the airfoil comprises an aircraft wing, and the movable control surface comprises an outboard aileron which is integral with a trailing edge of the wing.

A significant advantage of the invention is that, though the movable control surface is adapted to be moved through a range of deflected positions, the seal plate is adapted to function to substantially seal any streamwise gap which may otherwise form between the airfoil and the one end of the movable control surface when the movable control surface is in any one of the range of deflected positions. The seal plate is sized in accordance with the size of the range of deflected positions for a particular aircraft application.

In yet another aspect of the invention, an aircraft is provided which comprises an airfoil having a leading edge and a trailing edge and a movable flight control surface which is integral with the airfoil trailing edge. The movable flight control surface is adapted to extend away from the airfoil into a deflected position during flight, such that a streamwise gap is formed between an end of the movable control surface and the airfoil trailing edge. A fixed seal plate is attached at one end to the airfoil and extends generally vertically therefrom. It is adapted to substantially seal the streamwise gap when the movable control surface is deflected.

The invention, together with additional features and advantages thereof, may best be understood by reference to the following description taken in conjunction with the accompanying illustrative drawing.

DESCRIPTION OF THE PREFERRED EMBODIMENT

Figure 1:
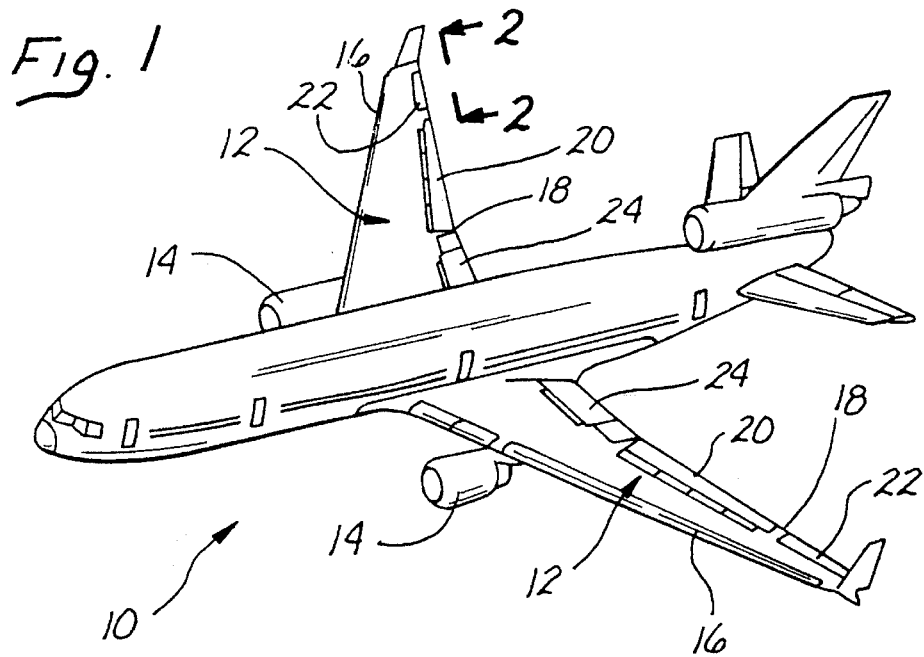
FIG. 1 is a perspective view illustrating a representative aircraft having movable flight control surfaces which may be adapted to be sealed by seal plates constructed and installed in accordance with the invention.
Figure 2:
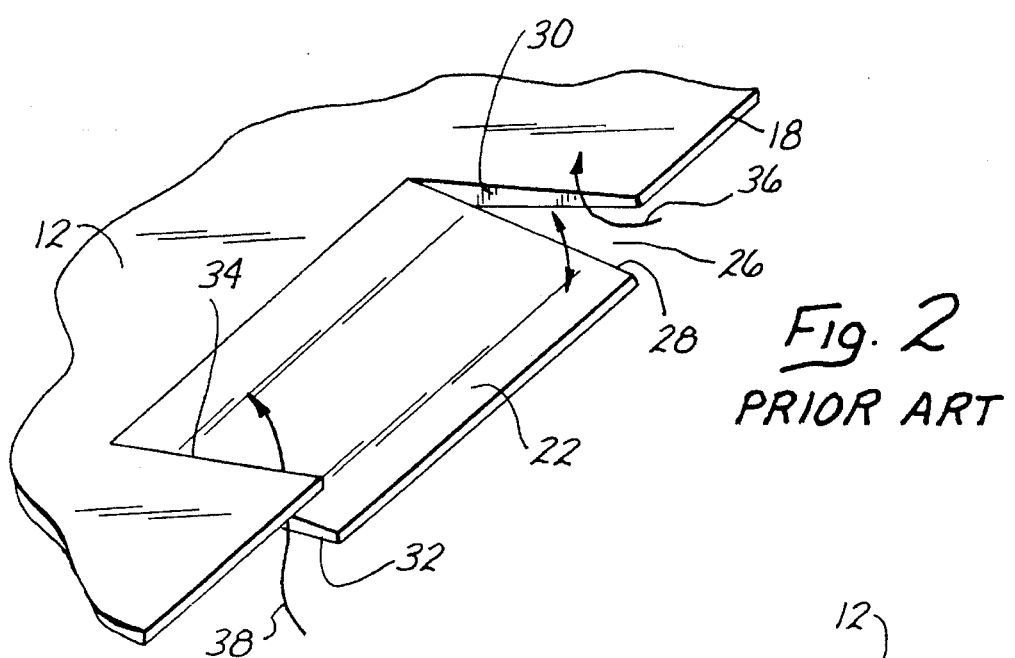
FIG. 2 is a fragmentary perspective view of an aileron in a deflected position, taken generally along lines 2—2 of FIG. 1, illustrating the air leakage which occurs through the gaps created between the airfoil and the deflected aileron surface in a typical prior art installation.
Figure 4:
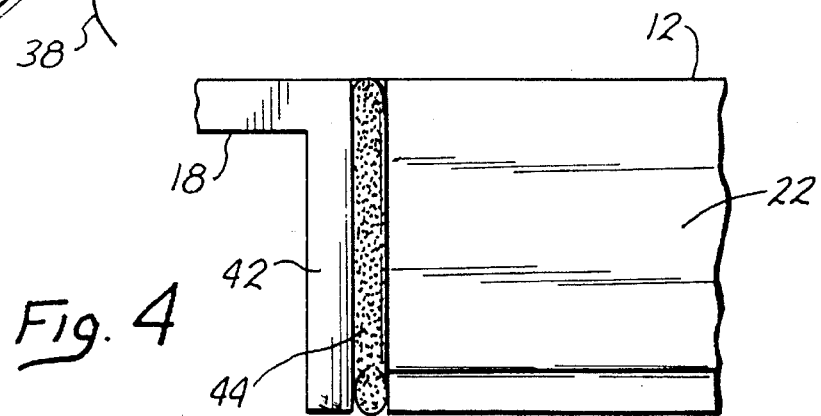
FIG. 4 is a cross-sectional view along lines 4—4 of FIG. 3, showing the employment of optional flexible seals between the ends of the deflected aileron and the seal plates, thereby even further reducing any air leakage.
Figure 3:
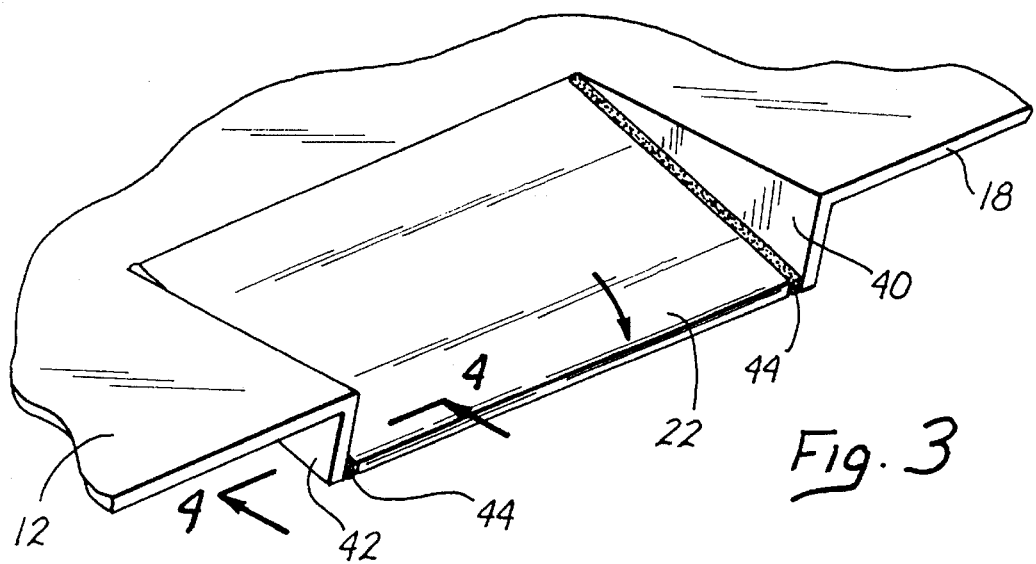
FIG. 3 is a fragmentary perspective view similar to FIG. 2, illustrating the substantial elimination of the gaps between the deflected aileron and the airfoil because of the installation of seal plates in a manner taught by the invention.
Figure 5:
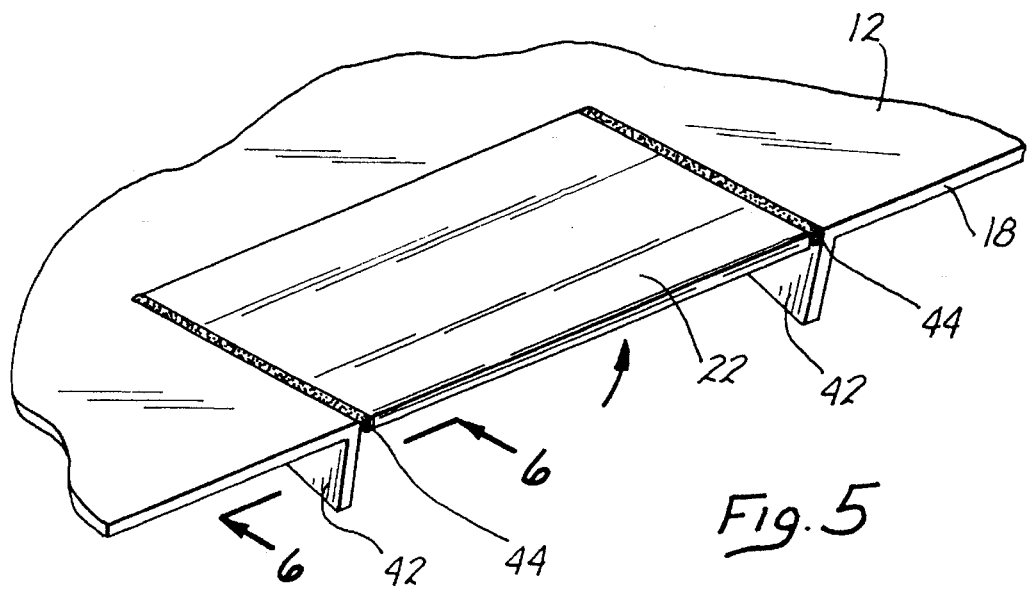
FIG. 5 is a fragmentary perspective view similar to FIG. 3, illustrating the aileron in an undeflected position.

Now with particular reference to FIGS. 1, and 3–6 the preferred inventive embodiment will be discussed FIGS. 3 and 5 are views similar to that of FIG. 2, which, along with FIG. 1, was discussed in the Background of the Invention. Like FIG. 2, FIG. 3 is taken along lines 2—2 of FIG. 1, except that the inventive feature is shown, namely first and second seal plates 40 and 42 restively. The seal plates 40 and 42 are illustrated in an installed position, attached to the airfoil 12 so that the streamwise gaps 26 created by the deflected aileron 22 are covered. Thus, air is prevented from flowing therethrough even when the aileron is extended in a deflected position.

The primary advantage obtained by employing seal plates 40 and 42 is that the gaps 26 (FIG. 2) on the edges of the movable control surface can be reduced, or sealed, for a range of surface deflections, rather than merely for the undeflected case (FIG. 5.) Thus, as the movable surface is deflected through its range of motion, the gap remains substantially sealed. The range of deflection that is desired to be sealed determines the size of the seal plate to be employed.

The seal plates 40 and 42 are illustrated as being essentially flat, but in actuality they may be curved and configured to match the respective configurations of the airfoil and the movable control surface. In the preferred embodiment, the seal plates are fabricated of a carbon epoxy composite material, and attached to the airfoil 12 using mechanical fasteners, such as screws and nut plates, and/or rivets, in a manner well known in the art. However, they could also be fabricated of aluminum, titanium, or other suitable structural aerospace materials.

Figure 6:
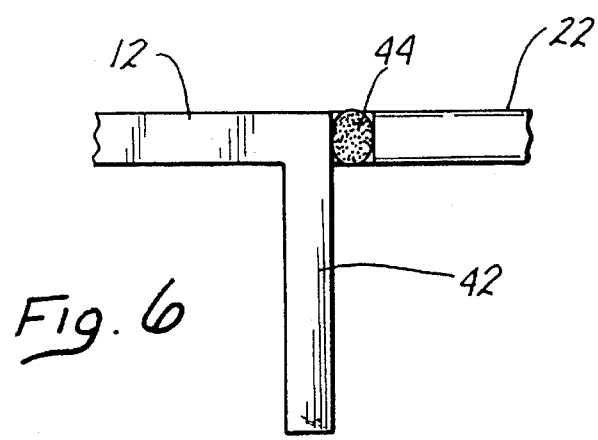
FIG. 6 is a cross-section view of the inventive seal plate taken along lines 6—6 of FIG. 5.

Referring now more particularly to FIGS. 4 and 6, as illustrated, a flexible seal 44 may optionally be attached to the movable surface 22 to assist in sealing any remaining gap which may exist between the movable surface and the seal plate. The flexible seal to be employed may be of a type similarly employed in the prior art to seal the gap between a movable control surface and an aircraft wing when the movable surface is in its undeflected position, as discussed in the Background of the Invention.

In the preferred embodiment, seal plates of the type described herein were installed for the outward ailerons 22 of an MD-11 aircraft by the assignee for this invention, McDonnell Douglas Corporation, and subject to flight testing. It was found that the seal plates reduced the aerodynamic drag of the aircraft by about 0.2%, which is an unexpectedly large and significant flight efficiency improvement. It is noted however, that while this invention was specifically conceived for large commercial jet transports, such as the MD-11, it is equally applicable to any type of aircraft having one or more airfoils and a movable flight control surface, such that its aerodynamic drag and thus its flight effidency may be measurably improved by sealing the gaps between its movable flight control surfaces and their respective airfoils. It is also equally applicable to all movable control surfaces, including the flaps, the inboard ailerons, and the outboard ailerons, and may be employed on one, some, or all of them.

Fundamentally, the inventive seal plate is advantageous and unique with respect to the prior art in that it is designed to prevent air leakage between a deflected movable airfoil control surface and the adjacent airfoil, it is fixed to the airfoil such that it does not articulate with the airfoil surface, therefore having no moving parts, and it extends outside the airfoil loft line. (The loft line of an airfoil is a term of art which defines the nominal shape of the airfoil, i.e. the outer periphery (skin) thereof. An element which extends outside the loft line extends outside the nominal shape of the airfoil, and is therefore subject to impact by ambient air.)

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An apparatus for sealing a streamwise gap between a movable flight control surface and an airfoil of an aircraft when movable control surface is in a deflected position, the movable flight control surface having a leading edge and a trailing edge, the leading edge being hingedly attached to said airfoil so that the trailing edge deflects upwardly or downwardly in a generally vertical direction when the flight control surface is pivoted about the hinged attachment along the leading edge, said apparatus comprising a fixed seal plate attached at one end to said airfoil and extending generally vertically therefrom.

2. An apparatus as recited in claim 1, wherein said seal plate extends generally in a downward direction.

3. An apparatus as recited in claim 2, wherein said seal plate is fixed to said airfoil at a location adjacent to one end of said movable control surface, so that any streamwise gap which may otherwise be formed between said airfoil and said one end of the movable control surface when said flight surface is deflected is substantially sealed by the seal plate.

4. An apparatus as recited in claim 3, wherein the apparatus includes a second seal plate which is fixed to said airfoil at a location adjacent to a second end of the movable control surface, so that any stream wise gap which may otherwise be formed between said airfoil and said second end when said flight surface is deflected is substantially sealed by said second seal plate.

5. An apparatus as recited in claim 3, and further including a flexible seal attached to said one end of said movable control surface, said flexible seal being adapted to provide a substantially fluid-tight seal between said movable control surface and the seal plate, thereby improving the seal between the movable control surface and the airfoil when the movable control surface is in a deflected position.

6. An apparatus as recited in claim 1, wherein said airfoil comprises an aircraft wing and said movable control surface comprises an outboard aileron which is integral with a trailing edge of said wing.

7. An apparatus as recited in claim 3, wherein said movable control surface is adapted to be moved through a range of deflected positions, and said seal plate is adapted to function to substantially seal any streamwise gap which may otherwise form between said airfoil and said one end of the movable control surface when the movable control surface is in any one of said range of deflected positions.

8. An apparatus as recited in claim 7, wherein said seal plate is sized in accordance with the size of the range of deflected positions for a particular aircraft application.

9. An apparatus as recited in claim 3, wherein said fixed seal plate extends outside the loft line of said airfoil.

10. An apparatus as recited in claim 1, wherein said seal plate is fabricated from a carbon epoxy composite material.

11. An aircraft comprising:

an airfoil having a leading edge and a trailing edge;

a movable flight control surface integral with said airfoil trailing edge, said movable control surface being adapted to extend away from said airfoil into a deflected position during flight, such that a streamwise gap is formed between an end of said movable control surface and said airfoil trailing edge; and a fixed seal plate which is attached at one end to said airfoil and extends generally vertically therefrom, said seal plate being adapted to substantially seal said streamwise gap when the movable control surface is deflected.

12. An aircraft as recited in claim 11, wherein said seal plate extends generally in a downward direction.

13. An aircraft as recited in claim 12, wherein a second streamwise gap is formed between a second end of said movable control surface and said airfoil trailing edge when the movable control surface is extended into said deflected position, said aircraft comprising a second fixed seal plate which is attached at one end to the airfoil at a location adjacent to the second end of the movable control surface, said second seal plate being adapted to substantially seal the second streamwise gap when the movable control surface is deflected.

14. An aircraft as recited in claim 12, and further including a flexible seal attached to said one end of said movable control surface, the flexible seal being adapted to provide a substantially fluid-tight seal between the movable control surface and the seal plate, thereby improving the seal between the movable control surface and the airfoil when the movable control surface is in a deflected position.

15. An aircraft as recited in claim 11, wherein said airfoil comprises an aircraft wing and said movable control surface comprises an outboard aileron which is integral with the trailing edge of said wing.

16. An aircraft as recited in claim 11, wherein said movable control surface is adapted to be moved through a range of deflected positions, and said seal plate is adapted to function to substantially seal any gap which may otherwise form between said airfoil and said one end of the movable control surface when the movable control surface is in any one of said range of deflected positions.

17. An aircraft as recited in claim 16, wherein said seal plate is sized in accordance with the size of the range of deflected positions for a particular aircraft application.

18. An aircraft as recited in claim 11, wherein said fixed seal plate extends outside the loft line of said airfoil.

19. An aircraft as recited in claim 11, wherein said seal plate is fabricated from a carbon epoxy composite material.

20. An aircraft as recited in claim 11, wherein said one end of the seal plate is attached to said airfoil by means of mechanical fasteners.

\* \* \* \* \*